Patented Nov. 7, 1922.

1,434,432

UNITED STATES PATENT OFFICE.

JOHN M. DONOHUE, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing. Application filed January 5, 1922. Serial No. 527,244.

*To all whom it may concern:*

Be it known that I, JOHN M. DONOHUE, a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates but is not limited to the ethers having that property. While the ethers form thin solutions in benzol or carbon tetrachlorid, it has been found that such single solvents by themselves do not dissolve a sufficient proportion of the ethers to make a desirably thick, flowable composition or dope, such as may be used, for instance, in the manufacture of photographic film base by the customary methods.

I have discovered that an adequately strong and useful solvent may be prepared by mixing these substances. While the proportions may vary largely, I prefer to mix these ingredients in equal proportions. The cellulose ether, such for example as water-insoluble ethyl cellulose, may be dissolved in this mixture in any convenient proportion. For use in photographic film base manufacture, there may be used 1 part by weight of the ether to from 4 to 6 parts by weight of the mixed solvent. Neither 4 to 6 parts by weight of carbon tetrachlorid alone nor 4 to 6 parts by weight of benzol alone will dissolve 1 part of this ether to form a flowable dope.

This mixed solvent of carbon tetrachlorid and benzol has the great advantage that it immensely reduces the danger of explosion in the usual apparatus without impairing the solvent qualities. This is especially useful where the solvent vapors, evolved when the film base sets or dries, are recovered by the conventional methods. The carbon tetrachlorid largely offsets the risk introduced by the benzol vapor.

Other substances which impart suppleness, incombustibility, or other qualities to the film may be added to the dope, such modifying agents being for instance triphenyl phosphate, tricresyl phosphate, camphor, monochlornaphthalene, etc.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A composition of matter, comprising cellulose ether, benzol and carbon tetrachlorid.

2. A flowable film-forming composition, comprising an alkyl ether of cellulose dissolved in a mixture of carbon tetrachlorid and benzol.

3. A viscous, flowable film-forming composition, comprising water-insoluble ethyl cellulose dissolved in a mixed solvent comprising approximately equal parts by weight of carbon tetrachlorid and benzol.

Signed at Rochester, New York, this 23rd day of December, 1921.

JOHN M. DONOHUE.